US012564906B2

(12) United States Patent
Murakami et al.

(10) Patent No.: US 12,564,906 B2
(45) Date of Patent: Mar. 3, 2026

(54) WELDING SYSTEM, METHOD FOR EVALUATING WELDING QUALITY, AND METHOD FOR MANUFACTURING WELDING PRODUCT

(71) Applicant: KABUSHIKI KAISHA YASKAWA DENKI, Kitakyushu (JP)

(72) Inventors: Masafumi Murakami, Kitakyushu (JP); Fuminori Inagaki, Kitakyushu (JP); Takuro Matsumoto, Kitakyushu (JP); Tomoko Takasu, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 1025 days.

(21) Appl. No.: 17/668,382

(22) Filed: Feb. 10, 2022

(65) Prior Publication Data

US 2022/0266395 A1 Aug. 25, 2022

(30) Foreign Application Priority Data

Feb. 16, 2021 (JP) ................................. 2021-022648

(51) Int. Cl.
*B23K 31/12* (2006.01)
*B23K 9/095* (2006.01)

(52) U.S. Cl.
CPC .......... *B23K 31/125* (2013.01); *B23K 9/0956* (2013.01)

(58) Field of Classification Search
CPC ...... B23K 9/0956; B23K 9/0953; B23K 9/16; B23K 9/1043; B23K 9/1336; B23K 9/28; B23K 9/32; B23K 31/006; B23K 31/125
See application file for complete search history.

(56) References Cited

U.S. PATENT DOCUMENTS

| | | | |
|---|---|---|---|
| 6,130,407 A | 10/2000 | Villafuerte | |
| 6,583,386 B1 * | 6/2003 | Ivkovich | .............. B23K 31/125 |
| | | | 228/103 |
| 2010/0314362 A1 | 12/2010 | Albrecht | |
| 2015/0352656 A1 * | 12/2015 | Murakami | ............. B23K 9/125 |
| | | | 219/124.03 |
| 2017/0032281 A1 | 2/2017 | Hsu | |

(Continued)

FOREIGN PATENT DOCUMENTS

| | | |
|---|---|---|
| CN | 107921587 | 4/2018 |
| JP | 08-75895 | 3/1996 |
| JP | 2010-110782 | 5/2010 |

(Continued)

OTHER PUBLICATIONS

Japanese Office Action for corresponding JP Application No. 2021-022648, Mar. 15, 2022 (w/ English machine translation).

(Continued)

*Primary Examiner* — Steven W Crabb
*Assistant Examiner* — Keith Brian Assante
(74) *Attorney, Agent, or Firm* — MORI & WARD, LLP

(57) ABSTRACT

A welding system includes a welder configured to weld a workpiece at welding points on the workpiece, data acquisition circuitry configured to acquire welding data indicating welding quality at the welding points, and quality evaluation circuitry configured to evaluate the welding quality at each of the welding points based on the welding data according to a determination algorithm which is associated with each of the welding points.

17 Claims, 10 Drawing Sheets

(56)         References Cited

U.S. PATENT DOCUMENTS

2020/0238420 A1 *  7/2020  Savage ..................... G01P 3/36
2020/0406392 A1    12/2020  Fukushima et al.

FOREIGN PATENT DOCUMENTS

| | | | |
|---|---|---|---|
| JP | 2017-039160 | 2/2017 | |
| JP | 6743084 B2 | 10/2019 | |
| JP | 2020-163453 | 10/2020 | |
| KR | 10-2075258 B1 | 1/2020 | |
| WO | WO-2013160745 A1 * | 10/2013 | ........... B23K 31/125 |

OTHER PUBLICATIONS

Chinese Office Action for corresponding CN Application No. 202210138129.3, Jul. 29, 2024 (w/ English machine translation).
Extended European Search Report for corresponding EP Application No. 22154945.4-1103, Jun. 29, 2022.
Chinese Office Action for corresponding CN Application No. 202210138129.3, Feb. 27, 2024 (w/ English machine translation).
European Office Action for corresponding EP Application No. 22 154 945.4-1103, Jul. 11, 2024.

* cited by examiner

Figure 4:
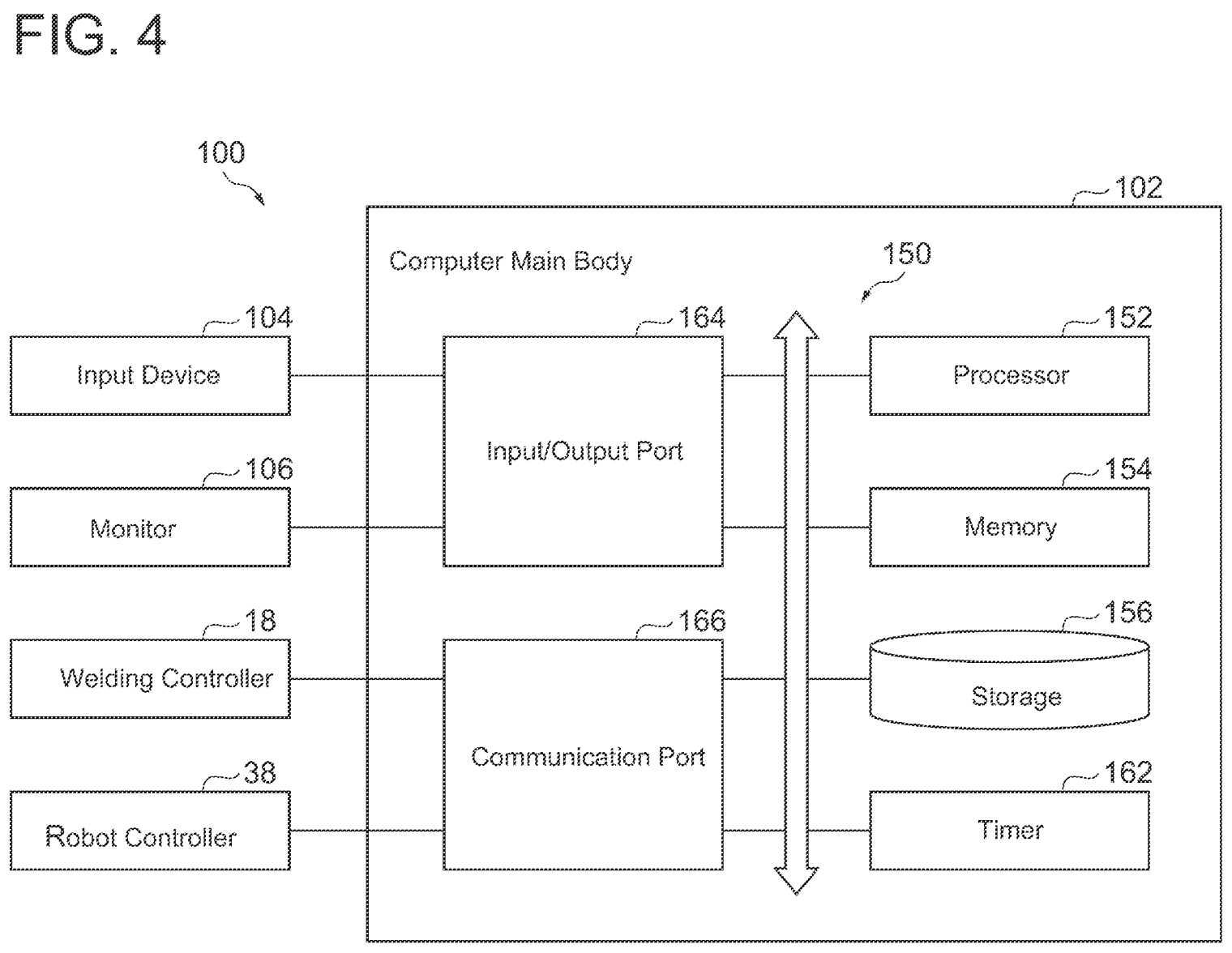

Computer Main Body

152 Processor

154 Memory

156 Storage

162 Timer

164 Input/Output Port

166 Communication Port

104 Input Device

106 Monitor

18 Welding Controller

38 Robot Controller

| Welding Point | Evaluation Target | Algorithm Construction | Algorithm Used |
|---|---|---|---|
| WP1 | Y | Y | – |
| WP2 | Y | Y | – |
| WP3 | Y | C | WP1 |
| WP4 | Y | C | WP2 |

FIG. 10

| Welding Point | Evaluation Result |
|---|---|
| WP1 | OK |
| WP2 | NG |
| WP3 | OK |
| WP4 | OK |

WELDING SYSTEM, METHOD FOR EVALUATING WELDING QUALITY, AND METHOD FOR MANUFACTURING WELDING PRODUCT

CROSS-REFERENCE TO RELATED APPLICATIONS

The present application claims priority under 35 U. S. C. § 119 to Japanese Patent Application No. 2021-022648, filed Feb. 16, 2021. The contents of this application are incorporated herein by reference in their entirety.

BACKGROUND OF THE INVENTION

Field of the Invention

The present disclosure relates to a welding system, a method for evaluating a welding quality, and a method for manufacturing a welding product.

Discussion of the Background

Japanese Patent Application Laid-Open No. 2020-163453 shows a method of generating a learned model by machine learning in which, when arc sound data obtained by collecting arc sound generated during welding with a microphone is input, a learned model that outputs quality data corresponding to the arc sound data is generated based on learning data accumulated in a storage unit.

SUMMARY OF THE INVENTION

According to one aspect of the present invention, a welding system includes a welder configured to weld a workpiece at welding points on the workpiece, data acquisition circuitry configured to acquire welding data indicating welding quality at the welding points, and quality evaluation circuitry configured to evaluate the welding quality at each of the welding points based on the welding data according to a determination algorithm which is associated with each of the welding points.

According to another aspect of the present invention, a method for evaluating a welding quality includes acquiring welding data indicating welding quality at welding points on a workpiece, and evaluating the welding quality at each of the welding points based on the welding data according to a determination algorithm which is associated with each of the welding points.

According to the other aspect of the present invention, a method for manufacturing a welding product includes welding a workpiece at welding points on the workpiece, acquiring welding data indicating welding quality at the welding points, and evaluating the welding quality at each of the weld functioning points based on the welding data according to a determination algorithm which is associated with each of the welding points.

BRIEF DESCRIPTION OF DRAWING

A more complete appreciation of the present disclosure and many of the attendant advantages thereof will be readily obtained as the same becomes better understood by reference to the following detailed description when considered in connection with the accompanying drawings.

FIG. 2 is a schematic diagram illustrating an example of a configuration of the welder.

FIG. 4 is a block diagram illustrating an example of a hardware configuration of the evaluation apparatus.

FIG. 5 is a block diagram illustrating an example of a structure of the evaluation apparatus.

FIG. 7 is a schematic diagram showing an example of a setting screen of the determination algorithm.

FIG. 10 is a schematic diagram illustrating an example of a screen showing an evaluation result of welding.

DESCRIPTION OF THE EMBODIMENTS

Figure 1:
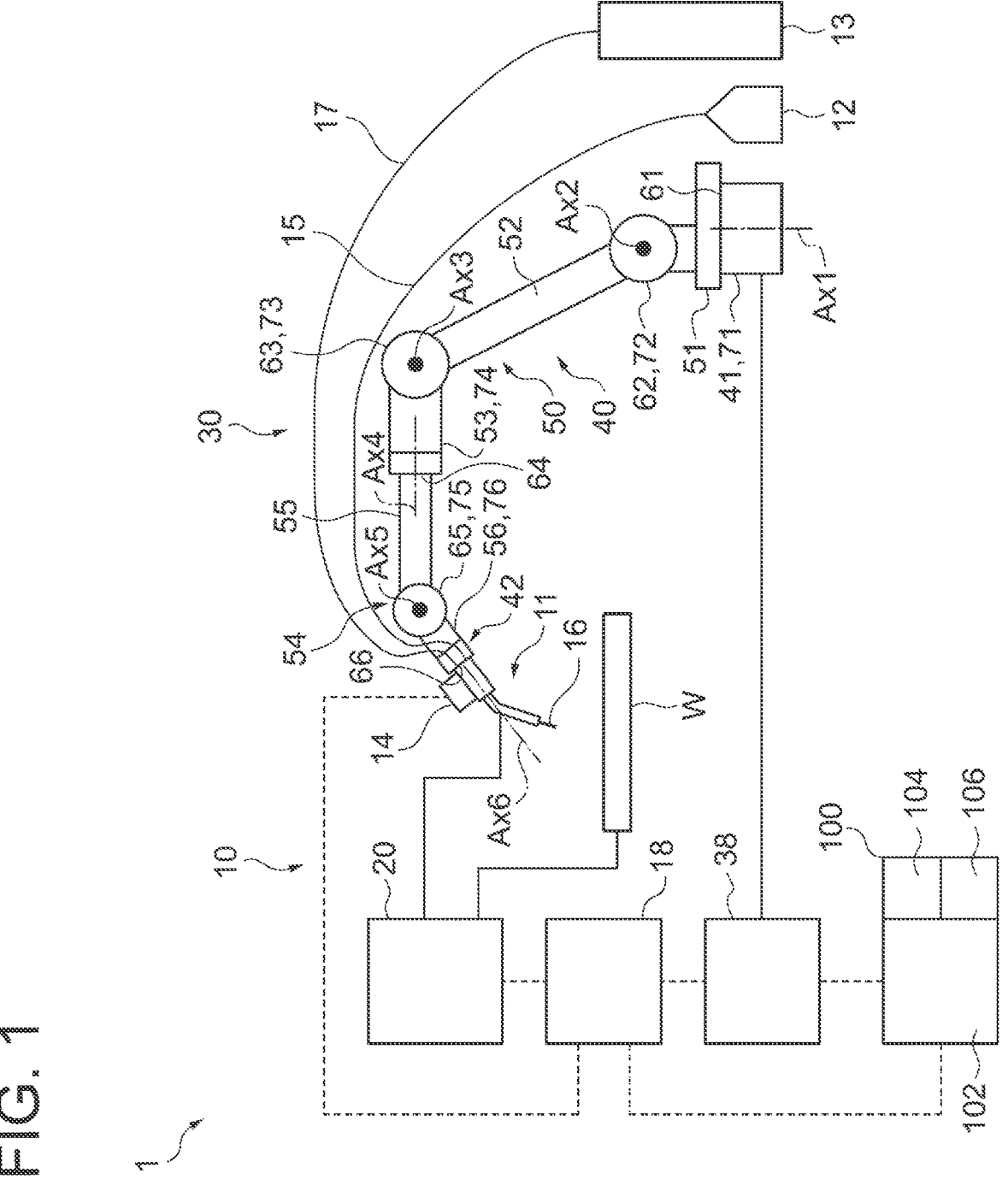
FIG. 1 is a schematic diagram illustrating an example of a configuration of a welding system.

Hereinafter, an embodiment will be described with reference to the drawings. In the description, the same elements or elements having the same functions are denoted by the same reference numerals, and redundant description will be omitted.

[Welding System]

A welding system 1 shown in FIG. 1 is configured to weld an object to be welded (hereinafter, referred to as a "workpiece W"). The present invention relates to a system for automatically performing at least a part of a welding operation on a workpiece. The welding performed by the welding system 1 may be of any type, such as laser welding, electron beam welding, and arc welding. Hereinafter, a case in which the welding system 1 performs fused electrode arc welding will be described as an example. The welding system 1 includes, for example, a robot apparatus 30, a welder 10, and an evaluation apparatus 100.

(Robot Apparatus 30)

The robot apparatus 30 includes a robot 40 and a robot controller 38. The robot 40 is a device that places a welding tool at a welding point (welding target position) set on the workpiece W. The welding tool is, for example, a welding torch to be described later. In one example, the robot 40 is a six-axis vertical articulated robot, and includes a base 41, a tool holder 42, and an articulated arm 50. The base 41 is installed on, for example, a floor surface in a work area of the robot 40. The base 41 may be installed on a movable portion such as a carriage.

The articulated arm 50 connects the base 41 and the tool holder 42, and changes the position and orientation of the tool holder 42 with respect to the base 41. The articulated arm 50 is, for example, a serial link type, and includes a turning portion 51, a first arm 52, a second arm 53, a wrist portion 54, and an actuator 71, 72, 73, 74, 75, 76.

The turning portion 51 is provided on an upper portion of the base 41 so as to be rotatable around a vertical axial line Ax1. That is, the articulated arm 50 has the joint 61 that allows the turning portion 51 to rotate around the axial line Ax1. The first arm 52 is connected to the base 41 so as to be rotatable about an axial line Ax1 intersecting (for example, orthogonal to) the axial line Ax2. That is, the articulated arm 50 has the joint 62 that allows the first arm 52 to rotate around the axial line Ax2. It is to be noted that the term "crossing" as used herein also includes a case in which they are in a twisted relationship with each other, such as a so-called solid crossing. The same applies to the following.

The second arm 53 is connected to an end portion of the first arm 52 so as to be rotatable about an axial line Ax1 intersecting the axial line Ax3. That is, the articulated arm 50 has the joint 63 that allows the second arm 53 to rotate around the axial line Ax3. The axial line Ax3 may be parallel to the axial line Ax2.

The wrist portion 54 includes a turning arm 55 and a swing arm 56. The turning arm 55 extends from an end portion of the second arm 53 along the center of the second arm 53, and is rotatable around an axial line Ax4 along the center of the second arm 53. That is, the articulated arm 50 has the joint 64 that allows the turning arm 55 to rotate around the axial line Ax4. The swing arm 56 is connected to an end portion of the turning arm 55 so as to be rotatable around an axial line Ax4 intersecting (for example, orthogonal to) the axial line Ax5. That is, the articulated arm 50 has the joint 65 that allows the swing arm 56 to rotate around the axial line Ax5.

The tool holder 42 is connected to an end portion of the swing arm 56 so as to be rotatable around an axial line Ax6 along a center of the swing atm 56. That is, the articulated arm 50 has the joint 66 that allows the tool holder 42 to rotate around the axial line Ax6. The tool holder 42 holds a welding tool.

The actuator 71, 72, 73, 74, 75, 76 includes a power supply such as an electric motor and drives each of the plurality of joints 61, 62, 63, 64, 65, 66 of the articulated arm 50. For example, the actuator 71 rotates the turning portion 51 around the axial line Ax1, the actuator 72 rotates the first atm 52 around the axial line Ax1, and the actuator 73 rotates the second arm 53 around the axial line Ax3. The actuator 74 rotates the turning arm 55 about the axial line Ax4, the actuator 75 rotates the swing arm 56 about the axial line Ax5, and the actuator 76 rotates the tool holder 42 about the axial line Ax6.

The configuration of the robot 40 described above is merely an example. The robot 40 may be configured in any manner as long as the position and orientation of the tool holder 42 (welding tool) with respect to the base 41 are changed by the articulated arm 50. For example, the robot 40 may be a seven-axis robot in which a redundant axis is added to the six-axis vertical articulated robot. The robot controller 38 controls the robot 40. For example, the robot controller 38 causes the actuators 71 to 76 to change the position and orientation of the tool holder 42 such that the welding tool is disposed at a welding position (more specifically, a position for performing welding on the welding position).

(Welder)

The welder 10 is an apparatus that performs welding of a welding point set on a workpiece W. The welder 10 welds a welding point set on a workpiece W by arc welding. For example, the welder 10 supplies a consumable electrode to the welding point and supplies power for welding between the consumable electrode and the workpiece W. The consumable electrode is an electrode that is melted and consumed as a welding material. The welder 10 includes, for example, a welding torch 11, a pail pack 12, a gas cylinder 13, a feeder 14, a welding power supply 20, and a welding controller 18. The configuration such as the arrangement position of each device included in the welder 10 illustrated in the drawings is an example, and can be appropriately changed. Although the hardware configurations of the robot controller 38, the welding controller 18, and the welding power supply 20 are separately configured in the figure, two or more of these devices may be configured as an integrated computing device. For example, the welding controller 18 may be incorporated in the welding power supply 20, or the robot controller 38, the welding controller 18, and the welding power supply 20 may be integrally configured.

The welding torch 11 is held by the tool holder 42 as described above, and guides the consumable electrode (for example, the welding wire 16) to the welding point. The welding torch 11 generates energy for welding to the workpiece W (hereinafter referred to as "welding energy"). The present invention relates to a welding tool and a welding method. A contact tip to which electric power as welding energy is supplied is provided at a distal end of the welding torch 11. The pail pack 12 supplies welding wire 16 to the welding torch 11. The pail pack 12 accommodates a welding wire 16 wound in a coil shape, for example, and is connected to the welding torch 11 via a conduit cable 15.

The gas cylinder 13 supplies a shielding gas to the welding torch 11. Examples of the shielding gas include carbon dioxide, argon, and a mixed gas thereof. The gas cylinder 13 is connected to the welding torch 11 via, for example, a gas hose 17.

The feeder 14 feeds the welding wire 16 supplied to the welding torch 11 toward the workpiece W. For example, the feeder 14 is provided in the welding torch 11, includes an actuator such as a servo motor, and performs forward feeding and reverse feeding of the welding wire 16 by a power supply thereof. The forward feeding means advancing the welding wire 16 so that the tip of the welding wire 16 approaches the workpiece W. The reverse feeding means that the welding wire 16 is retracted so that the tip of the welding wire 16 moves away from the workpiece W. The installation position of the feeder 14 is not limited to the above-described example, and the feeder 14 may be provided at any part of the robot 40 or may be provided at a position separated from the robot 40. The feeder 14 may perform forward feeding of the welding wire 16 without performing reverse feeding of the welding wire 16.

Figure 2:
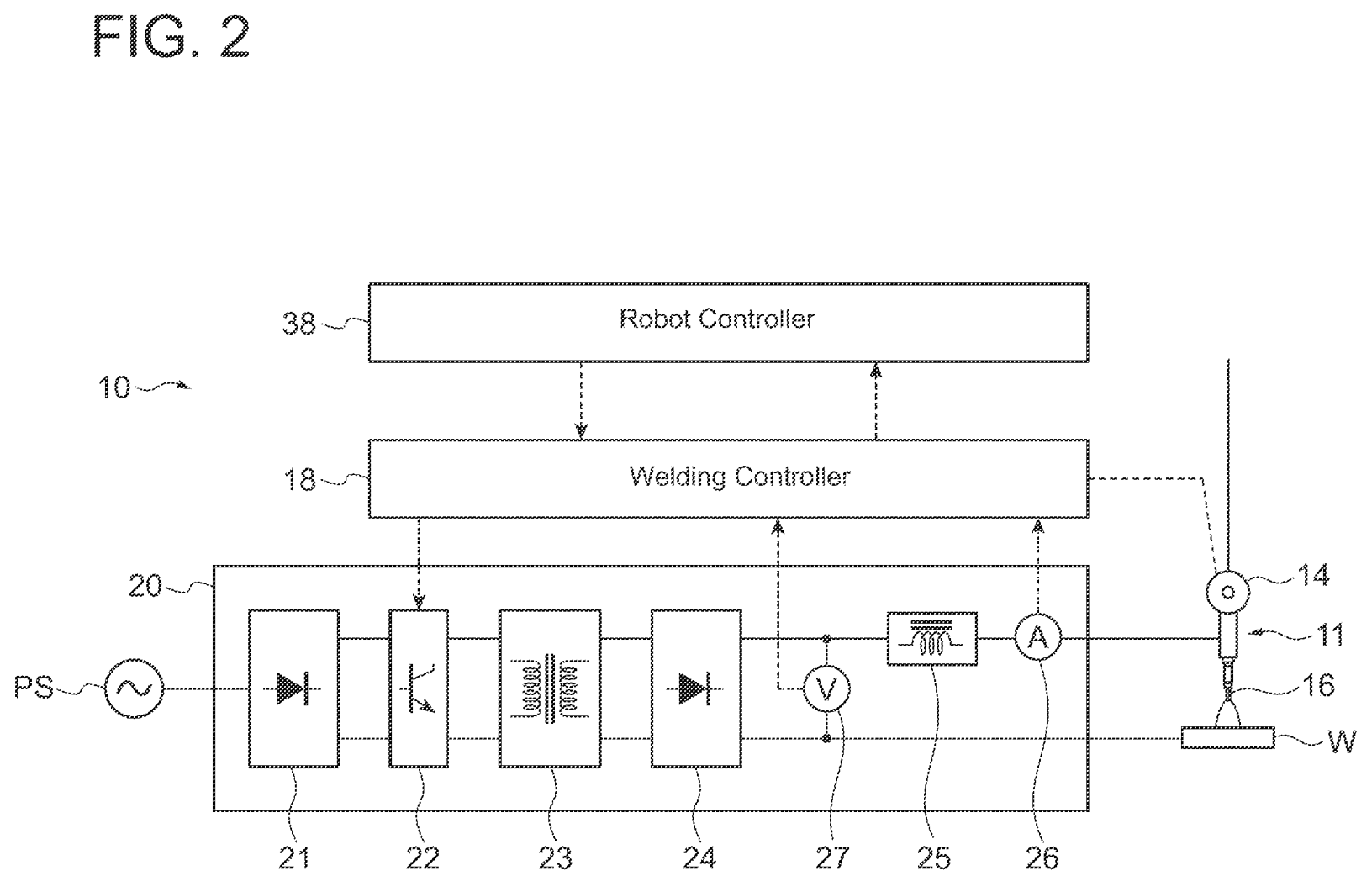

The welding power supply 20 is a power supply that generates electric power for generating arc discharge. The welding power supply 20 outputs a current between the welding wire 16 and the workpiece W. As illustrated in FIG. 2, the welding power supply 20 includes, for example, a primary rectifier circuit 21, an inverter circuit 22, a transformer 23, a secondary rectifier circuit 24, a reactor 25, a current sensor 26, and a voltage sensor 27.

The primary rectifier circuit 21 converts AC power supplied from the commercial power supply PS into DC power. The inverter circuit 22 converts the DC power converted into DC by the primary rectifier circuit 21 into AC power having an amplitude and a frequency in accordance with the control command. The transformer 23 changes the voltage and current of the primary side and outputs the changed voltage and current to the secondary side while insulating the primary side (inverter circuit 22 side) and the secondary side. The secondary rectifier circuit 24 converts the AC power on the secondary side of the transformer 23 into DC power and outputs the DC power between the welding wire 16 and the workpiece W.

The reactor 25 smooths the output power from the secondary rectifier circuit 24. The output power from the secondary rectifier circuit 24 is supplied between the welding wire 16 and the workpiece W. The current sensor 26 detects an output current from the secondary rectifier circuit 24. That is, the current sensor 26 detects a current flowing between the welding wire 16 and the workpiece W. The voltage sensor 27 detects an output voltage from the secondary rectifier circuit 24. That is, the voltage sensor 27 detects a voltage between the welding wire 16 and the workpiece W. The welding power supply 20 may include a polarity switching unit that switches the polarity of the electric power output from the secondary rectifier circuit 24.

The welding controller 18 controls the feeder 14 and the welding power supply 20. At this time, the welding controller 18 acquires a detection value of current from the current sensor 26, and acquires a detection value of voltage from the voltage sensor 27. The welding controller 18 controls the feeder 14 and the welding power supply 20 so as to perform supply of the welding wire 16 and power output to the welding wire 16 (power output between the welding wire 16 and the workpiece W), for example, according to a preset operation program. The welding controller 18 controls the feeder 14 and the welding power supply 20 to supply the welding wire 16 and output power while the robot controller 38 controls the robot 40 to change the position and orientation of the welding torch 11 with respect to the welding point. Thus, arc welding is performed on the welding point.

Figure 3:
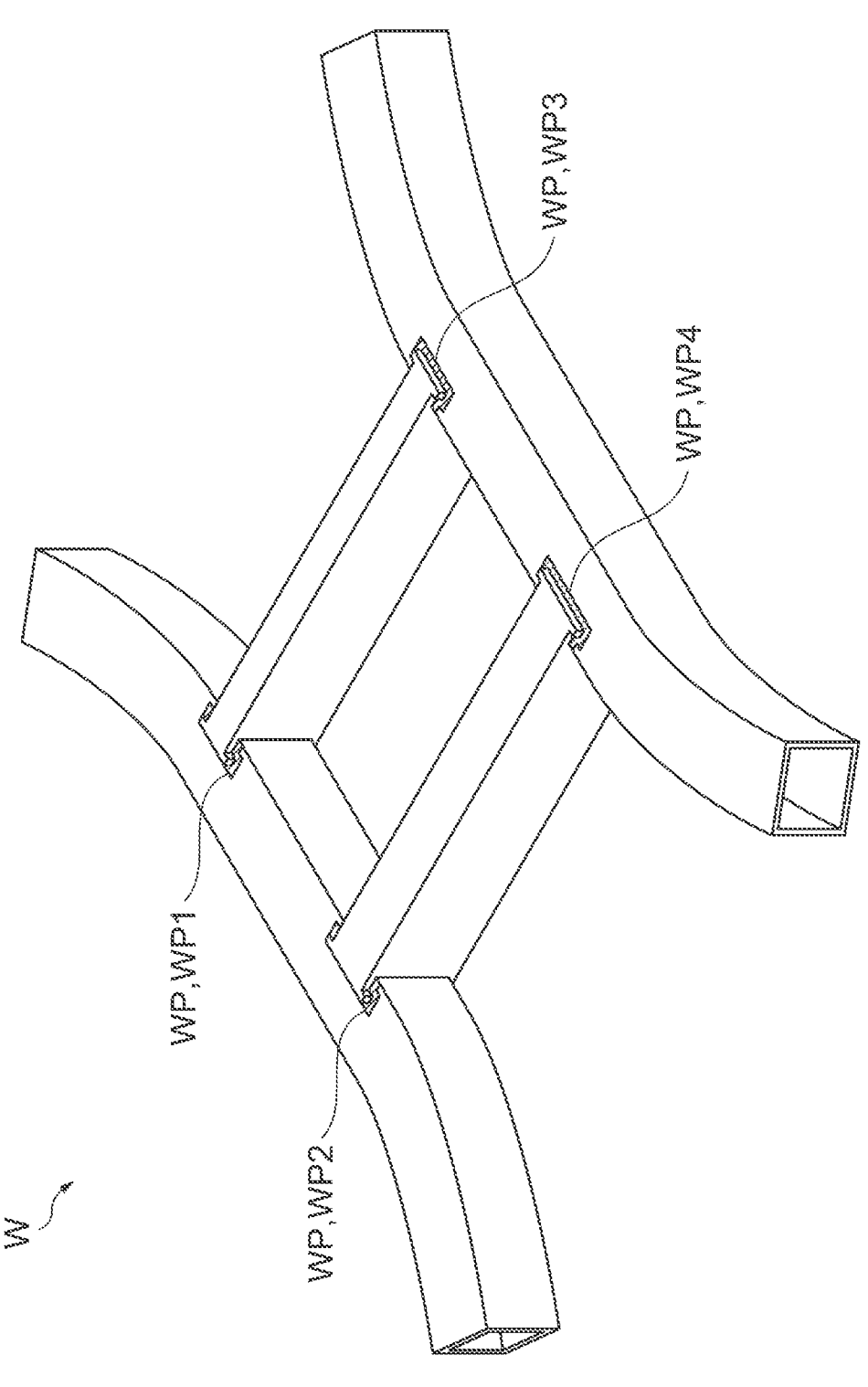
FIG. 3 is a schematic diagram illustrating an example of a workpiece and a plurality of welding points.

FIG. 3 shows an example of a workpiece W as an object to be welded. The welding product is manufactured through a process (manufacturing process) of welding to the workpiece W by the welding system 1. The welding product 602 may be various industrial products, a portion of an industrial product, an intermediate product from which an industrial product is derived, or a portion of an intermediate product. A plurality of welding points WP are set on the workpiece W. That is, the welder 10 performs welding on a plurality of welding points WP.

When arc welding is performed by the welder 10 as in the present embodiment, a welding bead, which is a continuous weld mark, is formed on the workpiece W after arc welding has been performed. For example, the welder 10 performs arc welding on a workpiece W such that a plurality of welding beads 206 are formed on the workpiece W. In one example, one welding point WP is set for each welding bead 206 (for each region where the welding bead 206 is formed). In this case, each of the welding points WP corresponds to one of the welding beads.

Different from the example described above, separate welding points WP may be set in a plurality of sections (virtual sections) obtained by dividing one welding bead 206. In this case, two or more welding points WP that respectively corresponds to two or more sections obtained by dividing one welding bead 206. By setting the welding points WP in this way, even with the same single welding bead 206, it is possible to evaluate the welding quality described later for each section included in the welding bead. Note that one welding point WP may be set for a group of a plurality of welding beads.

The welding system 1 performs arc welding by the welder 10 and the robot apparatus 30 for each of the welding points WP among a plurality of welding points WP. The welding system 1 repeatedly performs arc welding for each of the welding points WP on a plurality of workpieces W of the same type by the welder 10 and the robot apparatus 30. In the workpiece W shown in FIG. 3, welding points WP1 to WP4 are set as a plurality of welding points WP.

(Evaluation Apparatus)

Returning to FIG. 1, the evaluation apparatus 100 is a computer apparatus to evaluate the quality of welding (hereinafter, referred to as "welding quality") for each of the welding points WP when welding is performed on a plurality of welding points WP. For example, the evaluation apparatus 100 evaluates the welding quality for each of the welding points WP based on data acquired from the welding controller 18 and the robot controller 38. The evaluation apparatus 100 includes, for example, a computer main body 102, an input device 104, and a monitor 106.

The input device 104 is a device for inputting information to the computer main body 102. More specifically, the input device 104 inputs input information indicating an instruction from the user to the computer main body 102. The input device 104 may be any device capable of inputting desired information, and specific examples thereof include a keyboard, an operation panel, a mouse, and the like.

The monitor 106 is a device for displaying information output from the computer main body 102. When information from the computer main body 102 is displayed on the monitor 106, the user can confirm the information. The monitor 106 may be any device as long as it can display information on a screen, and a specific example thereof includes a liquid crystal panel.

FIG. 4 is a block diagram illustrating a hardware configuration of the evaluation apparatus 100. As shown in FIG. 4, the computer main body 102 of the evaluation apparatus 100 includes a circuit 150. Circuitry 150 includes one or more processors 152, memory 154, storage 156, timers 162, input/output ports 164, and communication ports 166. The storage 156 includes a computer-readable storage medium such as a non-volatile semiconductor memory.

The storage 156 stores a program for causing the computer main body 102 to acquire welding data indicating a state at the time of execution of welding with respect to a plurality of welding points WP set in the workpiece W and to evaluate the welding quality based on the acquired welding data and a determination algorithm which is associated with each of the welding points WP and via which the welding quality is determined according to an input of the welding data. The storage 156 stores, for example, a program for configuring each module described later in the computer main body 102.

The memory 154 temporarily stores a program loaded from a storage medium of the storage 156 and a calculation result by the processor 152. The processor 152 constitutes each module of the computer main body 102 by executing the program in cooperation with the memory 154. The timer 162 counts clock pulses of a predetermined cycle in response to a command from the processor 152 to measure an elapsed time. The input/output port 164 inputs and outputs information from and to the input device 104, the monitor 106, and the like in accordance with a command from the processor 152.

The communication port 166 performs wireless or wired communication with the welding controller 18 and the robot controller 38 in response to a command from the processor 152. Note that the functions of the circuit 150 are not necessarily implemented by a program. For example, at least a part of functions of the circuit 150 may be configured by a dedicated logic circuit or an application specific integrated circuit (ASIC) in which dedicated logic circuits are integrated. The hardware configuration of the evaluation apparatus 100 may be integrated with at least one of the robot controller 38 and the welding controller 18. In this case, one of the robot controller 38 and the welding controller 18 may have each function (each module described below) of the evaluation apparatus 100.

Figure 5:
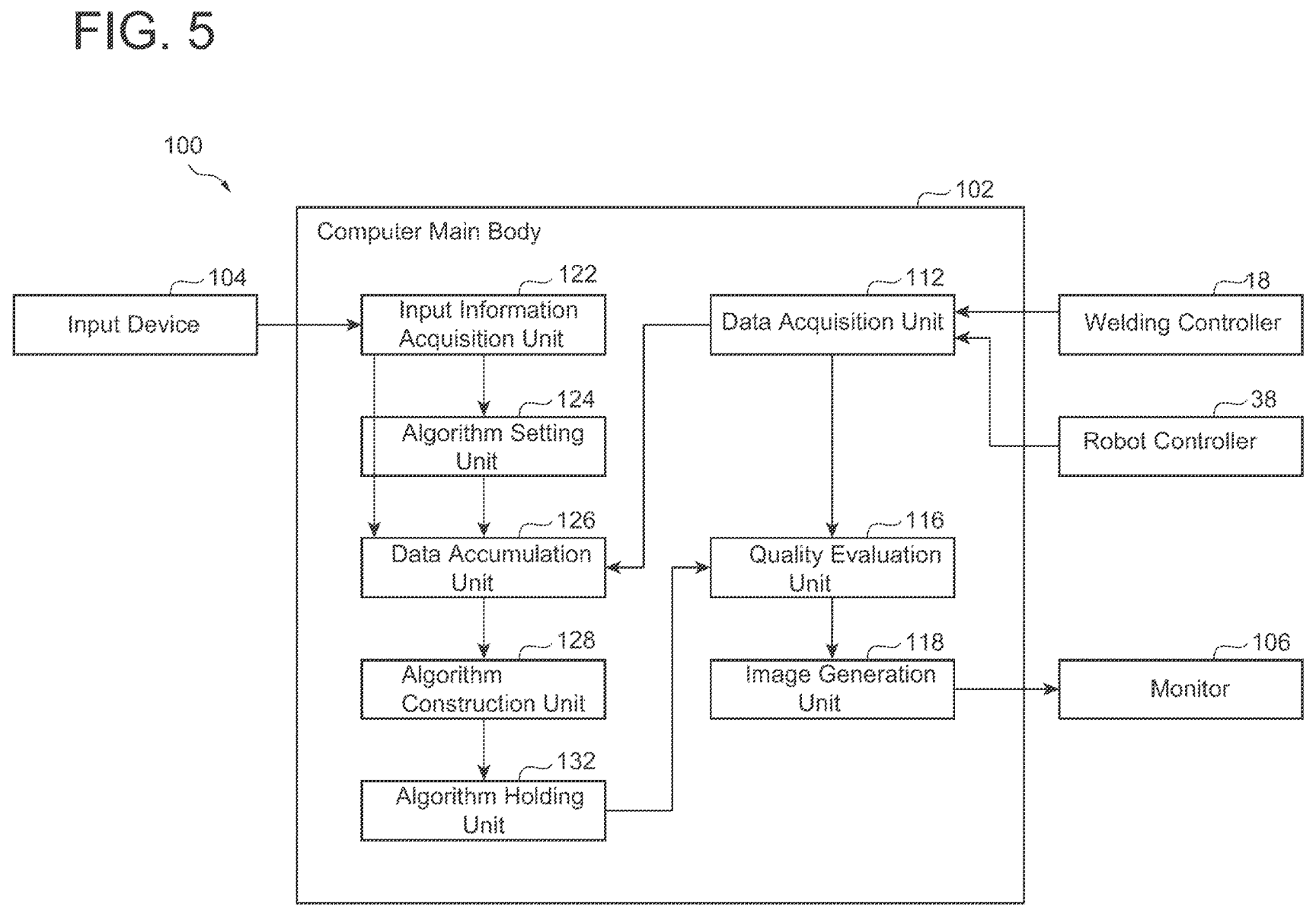

The computer main body 102 of the evaluation apparatus 100 has a structure (hereinafter referred to as a "module"), for example, as illustrated in FIG. 5. Referring to FIG. 5, the computer main body 102 includes a data acquisition unit (an example of "data acquisition circuitry") 112, a quality evaluation unit (an example of "quality evaluation circuitry") 116, an image generation unit (an example of "image generation circuitry") 118, an input information acquisition unit 122, an algorithm setting unit (an example of "algorithm setting circuitry") 124, a data accumulation unit (an example of "data accumulation circuitry") 126, an algorithm construction unit (an example of "algorithm construction circuitry") 128, and an algorithm holding unit 132. The processes executed by these modules correspond to the processes executed by the evaluation apparatus 100 (computer main body 102).

The data acquisition unit 112 acquires welding data indicating states of the plurality of welding points during execution of the welding on the plurality of welding points WP. The data acquisition unit 112 acquires welding data from at least one of the welder 10 and the robot 40. The data acquisition unit 112 may acquire the welding data from at least one of the welding controller 18 and the robot controller 38. Each time welding is performed on one welding point WP, the data acquisition unit 112 may acquire welding data on the welding points WP (welding data associated with the welding point WP). The data acquisition unit 112 may acquire the welding data after welding is performed on some or all of the plurality of welding points WP set on the workpiece W. The welding data acquired at this time may include data associated with each of the welding points WP.

The welding data is data in which a feature may appear when the welding quality is not normal compared to when the welding quality is normal. That is, a feature (tendency) of the welding data obtained when the welding quality is not normal may be different from a feature (tendency) of the welding data obtained when the welding quality is normal. The welding data may be one type of data or may include a plurality of types of data. In one example, the welding data includes at least data (hereinafter, referred to as "action data") indicating an action state of welding energy from the welder 10 to the workpiece W when welding is performed on the welding point WP.

The action data, which is a type of welding data, may include data obtained from at least one of a voltage and a current of a power supply (electric power) for generating an arc discharge. The action data includes, for example, current data obtained from the current sensor 26 of the welding power supply 20 when welding to one welding point WP is performed. The current data may be a current waveform (a waveform indicating a temporal change of a current value) obtained from the current sensor 26, or may be a feature amount acquired from the current waveform by the current sensor 26. The action data includes, for example, voltage data obtained from the voltage sensor 27 when welding to one welding point WP is performed. The voltage data may be a voltage waveform obtained from the voltage sensor 27 (of a voltage value) obtained from the voltage sensor 27, or may be a feature amount acquired from the voltage waveform by the voltage sensor 27.

The feature amount derived from the current waveform or the voltage waveform may be acquired for each predetermined period in the waveform. The feature amount derived from the current waveform or the voltage waveform may be any data as long as it is data in which a feature or a tendency may appear when the welding quality is not normal. Specific examples of the feature amount include an average value of a current value or a voltage value per predetermined period, the number of short circuits per predetermined period, a short circuit duration, and an arc time (a time for preparing for the next short circuit). In a case where a pulse current is output between the workpiece W and the welding wire 16, examples of the feature amount include the number of pulses per predetermined period, a peak voltage value of a pulse, and a peak current value of a pulse.

Instead of or in addition to the above-described operation data, the welding data is data (hereinafter, referred to as "operation data") indicating an operation state of the welder 10 when welding is performed on the welding point WP. The operation data includes, for example, data indicating an operating state of the feeder 14. Specific examples of the data include data indicating a speed (feeding speed) of the welding wire 16 fed from the feeder 14 and data indicating a load (feeding load) acting on a motor or the like for feeding the welding wire 16. The data indicating the feed rate and the data indicating the feed load may be average values per predetermined period.

The quality evaluation unit 116 evaluates the welding quality for each of the welding points WP based on the welding data acquired by the data acquisition unit 112 and the determination algorithm which is associated with each of the welding points WP. The quality evaluation unit 116 may evaluate the welding quality for each of the welding points WP based on the welding data and the determination algorithm which is associated with each of the welding points WP. The determination algorithm is defined to determine the welding quality in response to the input of the welding data. The determination algorithm may be an algorithm that outputs a determination result of the welding quality obtained by comparing the welding data with a reference value (threshold value) according to an input of the welding data. The determination algorithm may be a determination model constructed by machine learning so as to output a determination result of the welding quality in accordance with an input of the welding data.

The determination model constructed by machine learning may include a neural network in which various types of welding data are used as input vectors and results for evaluating welding quality are used as output vectors. The neural network has an input layer, one or more intermediate layers, and an output layer. The input layer directly outputs the input vector to the next intermediate layer. An intermediate layer converts an input from a previous layer by an activation function and outputs the converted input to a next layer. The output layer converts an input from an intermediate layer farthest from the input layer by an activation function and outputs a conversion result.

For example, by referring to the plurality of determination algorithms held (stored) by the algorithm holding unit 132, the quality evaluation unit 116 evaluates the welding quality for each of the welding points WP using the determination algorithm which is associated with each of the welding points WP. In this case, the plurality of determination algorithms held by the algorithm holding unit 132 may be associated with each of the welding points WP.

The welding data may vary depending on a setting operation of the robot 40 at the time of welding to the welding point WP. That is, even when welding is performed on the same welding point WP, if the operation of the robot 40 during welding is different, the welding data obtained at that time may be different. Therefore, the quality evaluation unit 116 may evaluate the welding quality by using the determination algorithm which is associated with each of the welding points WP and the setting operation of the robot 40 set in advance for the welding points WP. In this case, for one welding point WP, a plurality of setting operations of the robot 40 may be set in advance or one setting operation may be set in advance. The determination algorithm may be prepared for each setting operation. In the setting operation, for example, a change in the position and orientation of the robot 40 with respect to the welding point WP and a moving speed are determined.

The quality evaluation unit 116 may evaluate the welding quality for each of two or more welding points WP set as evaluation targets by the user among the plurality of welding points WP. The evaluation target of the welding quality may be all of the plurality of welding points WP or may be a part of the plurality of welding points WP. In a case where the determination algorithm is set to determine whether or not welding is normal by comparing the welding data with a threshold value, the quality evaluation unit 116 determines whether or not welding is normal by obtaining a determination result of the determination algorithm according to an input of the welding data.

The quality evaluation unit 116 may evaluate the welding quality by calculating the degree of deviation from the reference quality. For example, in a case where the determination algorithm is defined to calculate the degree of deviation from a reference value (a reference value determined to be normal) of the welding data, the quality evaluation unit 116 may calculate the degree of deviation from reference quality by obtaining a calculation result by the determination algorithm according to an input of the welding data.

In a case where the determination algorithm is a determination model constructed by machine learning so as to output a determination result of the welding quality according to an input of the welding data, the quality evaluation unit 116 may evaluate the welding quality by obtaining a determination result by the determination model according to the input of the welding data. The determination result by the determination model may be a determination result of whether or not welding is normal, or may be a calculation result of a degree of deviation from a reference quality at which it is determined that welding is normal.

The image generation unit 118 generates an evaluation result image including an image (hereinafter, referred to as a "workpiece image") in which information indicating an evaluation result by the quality evaluation unit 116 for each of the welding points WP and information indicating a plurality of welding points WP are superimposed on the workpiece W. The image generation unit 118 generates (outputs) the evaluation result image on the monitor 106 in a phase of evaluating welding to the workpiece W of which the welding quality is unknown.

The image generation unit 118 generates an interface image (hereinafter referred to as an "interface image") including a workpiece image in which information indicating a plurality of welding points WP is superimposed on the workpiece W. The image generation unit 118 generates (outputs) the interface image on the monitor 106 in a phase of preparing a determination algorithm for evaluating welding to the workpiece W.

The input information acquisition unit 122 acquires input information from a user. For example, in the phase of preparing the determination algorithm, the input information acquisition unit 122 may acquire an instruction from the user based on an input to the interface image generated by the image generation unit 118. In the phase of preparing the determination algorithm, the input information acquisition unit 122 may acquire information indicating a user's evaluation result (for example, a classification result of whether or not it is normal) of the quality of welding to the welding points WP.

In response to an instruction from the user acquired by the input information acquisition unit 122, the algorithm setting unit 124 sets a determination algorithm corresponding to each of at least some of the plurality of welding points WP. By setting the corresponding determination algorithm for each of the welding points WP, one determination algorithm is assigned to each of the welding points WP. For example, the algorithm setting unit 124 sets the determination algorithm for each of the welding points WP for the welding points WP to be evaluated (in one example, all the welding points WP) among the plurality of welding points WP. The algorithm setting unit 124 may acquire a plurality of determination algorithms from a device external to the evaluation apparatus 100 and then set (assign) each of the plurality of determination algorithms to each of the welding points WP in accordance with an instruction from the user.

The algorithm setting unit 124 may set (assign) the determination algorithm for each of the welding points WP by setting the determination algorithm to be constructed in the evaluation apparatus 100 for at least a part of the welding points WP. In one example, in response to an instruction from the user, the algorithm setting unit 124 sets some welding points WP (first welding points) among the plurality of welding points WP as points for constructing the determination algorithm on the basis of the accumulated data of the welding data. In response to an instruction from the user, the algorithm setting unit 124 sets the remaining part (second welding point) of the plurality of welding points WP as a point to which the determination algorithm constructed for the other welding points WP is assigned.

The data accumulation unit 126 accumulates the welding data acquired by the data acquisition unit 112 (for example, the welding data acquired for each of the welding points WP) in association with the welding points WP. For example, in the phase in which the determination algorithm is prepared, the data accumulation unit 126 accumulates the welding data and the ID (identification information) of the welding points WP in association with each other for the welding points WP set when the determination algorithm is constructed. The data accumulation unit 126 may further associate a preset operation of the robot 40 (information indicating the preset operation when the welding data is obtained) with the welding points WP and accumulate the welding data.

The algorithm construction unit 128 constructs a determination algorithm for each of the welding points WP for at least a part of the plurality of welding points WP based on the accumulated data accumulated by the data accumulation unit 126. For example, the algorithm construction unit 128 constructs a determination model by machine learning for the welding points WP set to construct the determination algorithm based on the accumulated data of the welding data associated with the welding points WP.

In one example, the algorithm construction unit 128 constructs, by machine learning, a determination model including an approximation algorithm constructed so as to output virtual data approximate to the welding data in response to input of the welding data. The approximation algorithm may be, for example, an autoencoder or a variational autoencoder (VAE), which is a type of neural network, and is constructed such that output data matches input data. The algorithm construction unit 128 may construct the approximation algorithm based on the accumulated data of the welding data whose welding quality has been determined to be normal.

The determination model including the approximation algorithm may be constructed such that when unevaluated welding data is input, an evaluation result of the welding quality is output based on a degree of deviation between the welding data and virtual data obtained from the approximation algorithm. The degree to which the welding quality is not normal may be determined to be larger as the degree of deviation is larger. In a case where a plurality of setting operations of the robot 40 are defined for one welding point WP, the algorithm construction unit 128 may construct the determination algorithm (for example, the determination model) for each setting operation.

The algorithm holding unit 132 holds (stores) a plurality of determination algorithms respectively associated with a plurality of welding points WP. The algorithm holding unit 132 may hold (store) the plurality of determination algorithms constructed by the algorithm construction unit 128. For example, the algorithm holding unit 132 holds the determination algorithm constructed by the algorithm construction unit 128 in association with the welding points WP set when the determination algorithm is constructed. For example, the algorithm holding unit 132 holds the determination algorithm constructed at another location in association with the welding points WP to which the determination algorithm constructed at another location is set to be assigned.

Subsequently, various series of processes executed by the evaluation apparatus 100 will be described as an example of an evaluation method of the welding quality with reference to FIGS. 6 to 9. The various series of processes include a series of processes in a preparation phase performed before the evaluation of the welding quality is performed and a series of processes in an evaluation phase in which the evaluation of the welding quality is performed. The series of processes in the preparation phase includes a series of processes of various settings by the user and a series of processes of constructing the determination algorithm.

(Setting Method by User)

Figure 6:
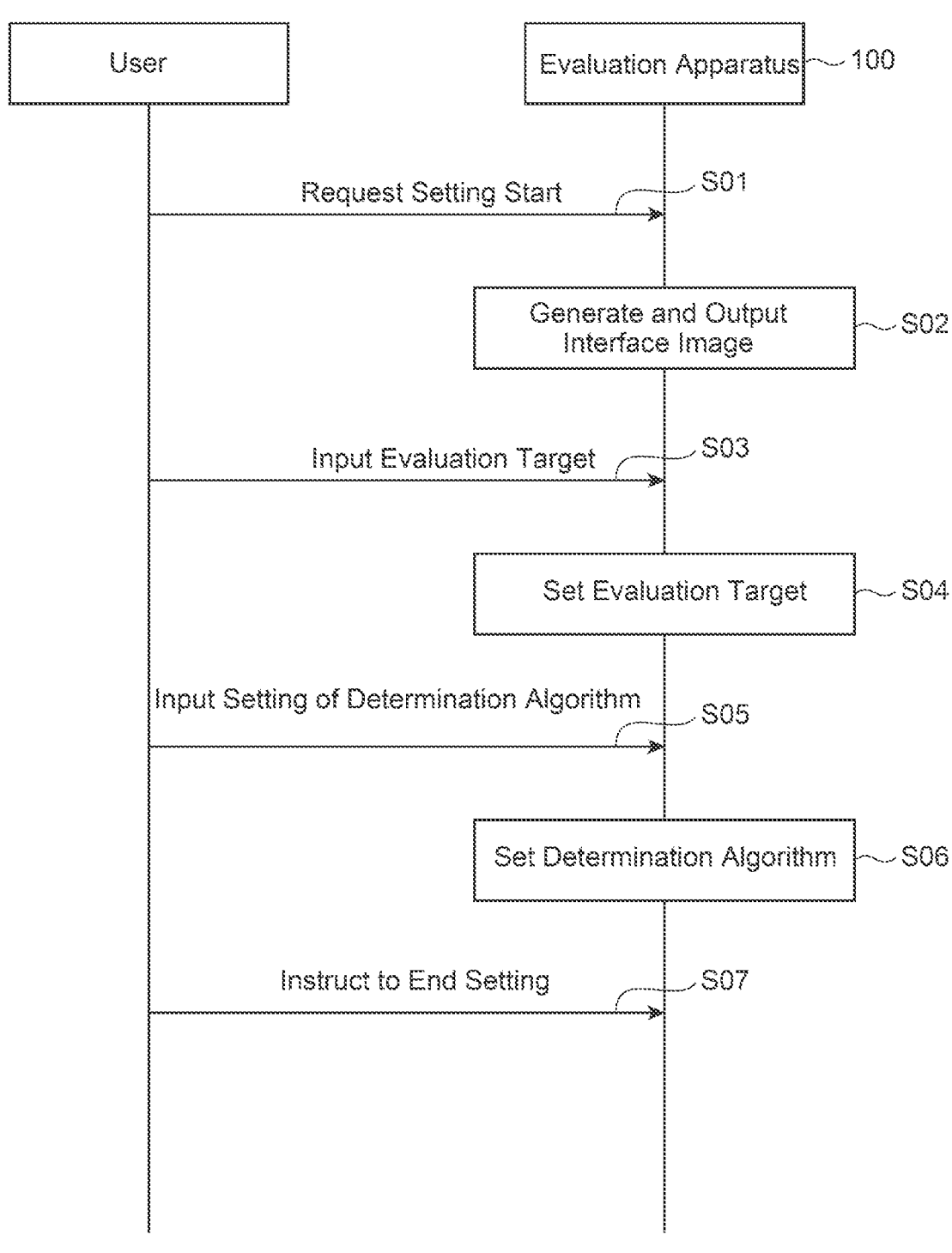
FIG. 6 is a sequence diagram showing an example of a method of setting the determination algorithm.

FIG. 6 is a sequence diagram illustrating an example of a series of processes of various settings by the user. In this setting process, for example, the evaluation apparatus 100 starts the process by receiving a setting start request from the user (step S01). First, the evaluation apparatus 100 executes step S02. In step S02, for example, the image generation unit 118 generates the interface image including the workpiece image in which information indicating a plurality of welding points WP is superimposed on the workpiece W. In one example, the image generation unit 118 displays the interface image on the monitor 106.

Next, upon receiving an input of an object to be evaluated from the user (step S03), the evaluation apparatus 100 executes step S04. In step S04, for example, the evaluation apparatus 100 sets an evaluation target for the welding quality among a plurality of welding points WP set on the workpiece W based on input information from the user. The user may set all of the plurality of welding points WP set on the workpiece W as evaluation targets, or may set two or more of the plurality of welding points WP set on the workpiece W as evaluation targets.

Next, upon receiving an input of the setting of the determination algorithm from the user (step S05), the evaluation apparatus 100 executes step S06. In step S06, for example, the algorithm setting unit 124 sets the determination algorithm for each of the welding points WP with respect to the plurality of welding points WP set to be evaluated in step S04. Then, when an instruction to end the setting is received from the user, a series of processes of various settings by the user ends.

FIG. 7 shows an example of an interface image displayed during execution of a series of processes of the various settings. The interface image 200 illustrated in FIG. 7 includes a workpiece image 202 and setting information 204. The workpiece image 202 includes a workpiece W and information indicating welding points WP1 to WP4 set on the workpiece W. The information indicating the welding points WP1 to WP4 is superimposed on the workpiece W to indicate where on the workpiece W the welding point is located.

The setting information 204 indicates information set based on input information from the user. In the example illustrated in FIG. 7, whether or not the welding quality is to be evaluated, whether or not the determination algorithm is to be constructed, and the allocation source (copy source) of the determination algorithm are set for each of the welding points WP1 to WP4 based on the input information from the user. "Y" in the column of "evaluation target" indicates that the spot is a target of evaluation of the welding quality. "Y" in the column of "algorithm construction" indicates a place where the determination algorithm is constructed, and "C" indicates a place where the determination algorithm constructed in another place is assigned.

The "algorithm used" indicates the welding points WP of the allocation source of the spot to which the determination algorithm is allocated. For example, the welding point WP1 (first welding point) is set as a point to be evaluated for the welding quality and for which the determination algorithm is constructed. The welding point WP3 (second welding point) is set as a point to which the welding quality is evaluated and to which the determination algorithm constructed at the welding point WP1, which is another point, is assigned (copied) without constructing the determination algorithm. As in the example illustrated in FIG. 7, a welding point (for example, a welding point WP2) currently set by the user may be displayed differently from other locations on the workpiece image 202.

(Algorithm Construction Method)

Figure 8:
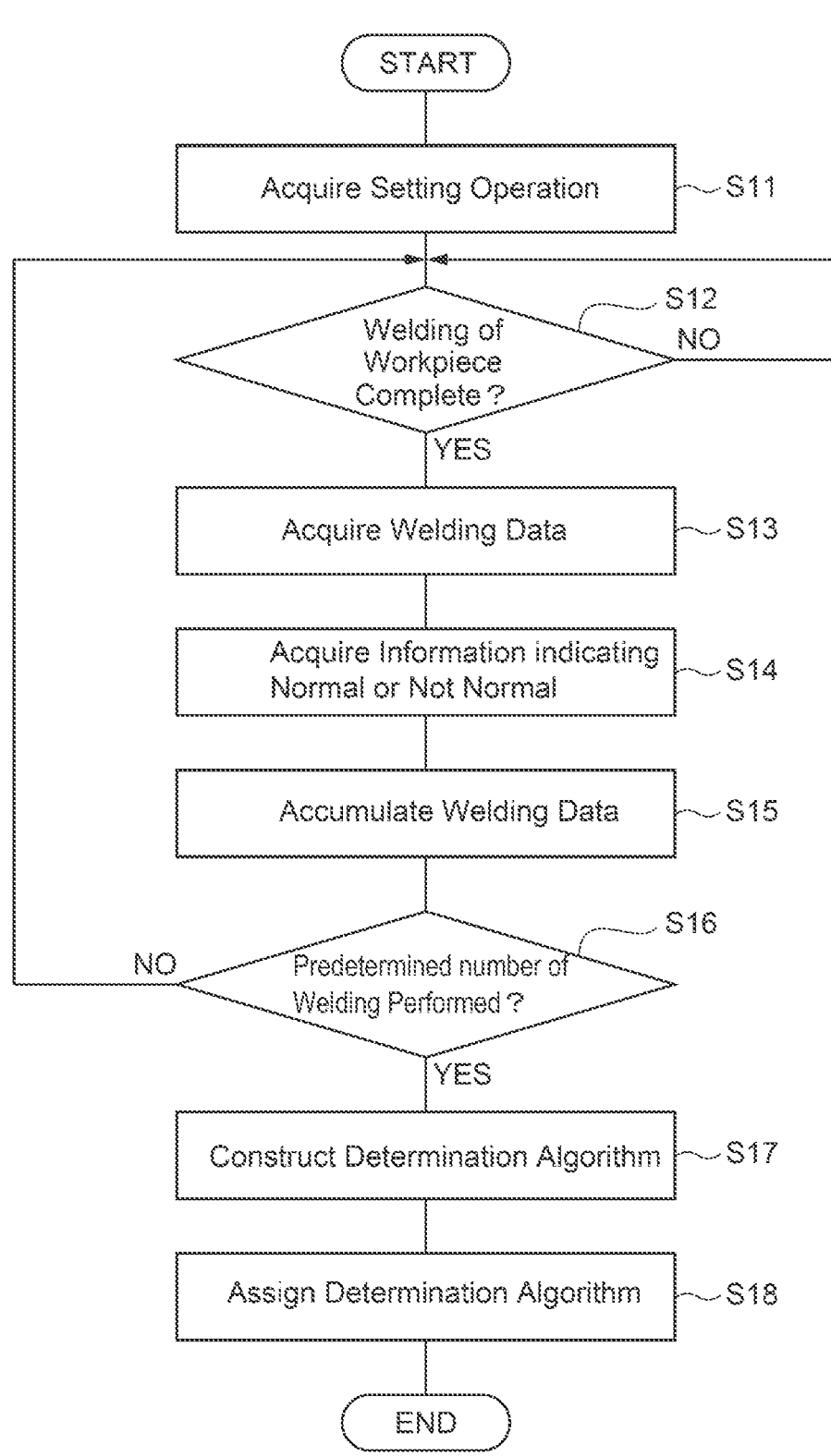
FIG. 8 is a flowchart showing an example of a method of constructing the determination algorithm.

FIG. 8 is a flowchart showing a series of processes for constructing the determination algorithm. The series of processes for constructing the determination algorithm is executed after the above-described series of processes (step S07) for setting by the user, and is executed in parallel with welding on the plurality of workpieces W. This welding may be welding to a test workpiece W or welding to a workpiece W in an actual manufacturing stage.

In a series of processes for constructing the determination algorithm, first, the evaluation apparatus 100 executes step S11. In step S11, for example, the data acquisition unit 112 acquires information indicating a setting operation of the robot 40 when welding is performed on the workpiece W. In one example, the data acquisition unit 112 acquires, from the robot controller 38, information indicating a setting operation of the robot 40 when welding is performed in parallel.

Next, the evaluation apparatus 100 executes step S12. In step S12, for example, the data acquisition unit 112 waits until welding of one workpiece W is completed. The data acquisition unit 112 waits until execution of welding on all of the plurality of welding points WP set on one workpiece W is completed.

Next, the evaluation apparatus 100 executes step S13. In step S13, for example, the data acquisition unit 112 acquires the welding data for each of the welding points WP on the workpiece W on which welding has been performed while waiting in step S12. In one example, the data acquisition unit 112 acquires various feature amounts obtained from a voltage or a current of electric power supplied to the workpiece W for arc discharge as the welding data for each welding on each of the welding points WP.

Next, the evaluation apparatus 100 executes step S14. In step S14, for example, the input information acquisition unit 122 acquires, for each of the welding points WP, a result of evaluating the welding quality by the user with respect to the workpiece W on which welding has been step S12. The input information acquisition unit 122 may acquire information indicating that welding is normal or information indicating that welding is not normal for each of the welding points WP as an evaluation result of the welding quality by the user.

Next, the evaluation apparatus 100 executes step S15. In step S15, for example, the data accumulation unit 126 accumulates (records) the welding point WP and the welding data in association with each other for each of the welding points WP. The data accumulation unit 126 may accumulate the welding points WP and the welding data in association with each other for the welding points WP set as the evaluation target. The data accumulation unit 126 may further accumulate the setting operation of the robot 40 obtained in step S11 in association with the welding data.

Next, the evaluation apparatus 100 executes step S16. In step S16, for example, the evaluation apparatus 100 determines whether or not welding has been performed on a predetermined number of workpieces W. The predetermined number is set in advance, for example, to such an extent that the determination algorithm can be constructed. In step S16, when it is determined that welding has not been performed on the predetermined number of workpieces W (step S16: NO), the process returns to step S12, and the evaluation apparatus 100 repeats steps S12 to S16.

On the other hand, when it is determined in step S16 that welding has been performed on the predetermined number of workpieces W (step S16: YES), the evaluation apparatus 100 performs step S17. In step S17, for example, the algorithm construction unit 128 constructs the determination algorithm for each of the welding points WP based on the welding data accumulated by repeatedly executing step S15.

In one example, the algorithm construction unit 128 constructs the determination algorithm for each of the welding points WP with respect to a point set to construct the determination algorithm among the welding points WP to be evaluated. The determination algorithm is an algorithm constructed according to the setting operation acquired in step S11.

Next, the evaluation apparatus 100 executes step S18. In step S18, for example, the algorithm holding unit 132 assigns the determination algorithm to a portion of the welding points WP to be evaluated to which the determination algorithm constructed in another portion is set to be assigned. The algorithm holding unit 132 allocates the determination algorithm constructed in one welding point WP in step S06 to the welding point WP to be allocated based on the input information from the user in step S17.

The algorithm holding unit 132 holds the determination algorithm constructed in step S17 and the determination algorithm assigned in step S18 in association with the ID of the welding point WP. Thus, a series of processes for constructing the determination algorithm is completed. In a case where there is a setting operation different from the setting operation obtained in step S11 as an operation of the robot 40 for workpieces W of the same type, the evaluation apparatus 100 may separately (further) execute the processing of steps S11 to S17 when welding is executed in the different setting operation.

(Evaluation Method of Welding Quality)

Figure 9:
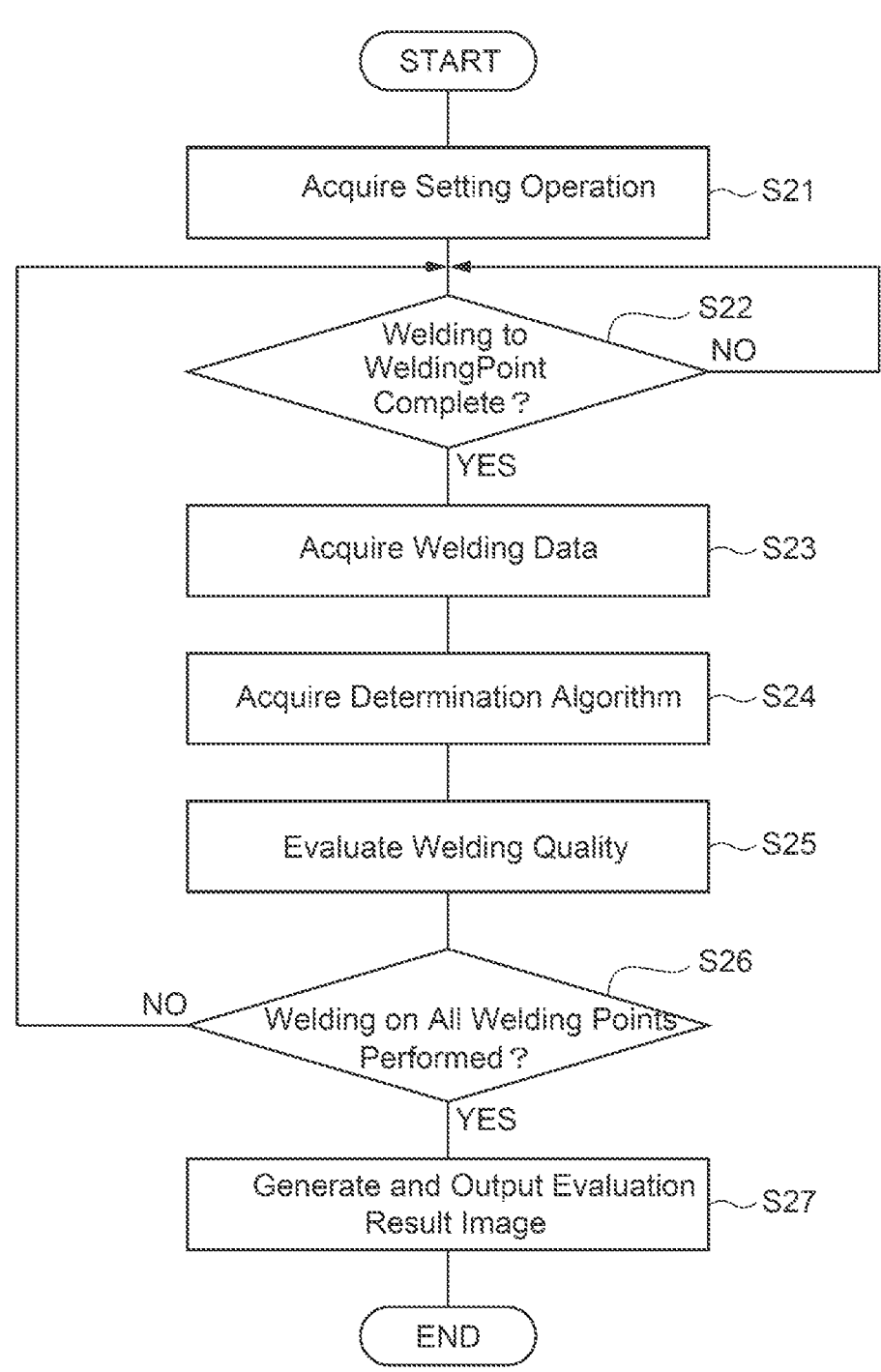
FIG. 9 is a flowchart illustrating an example of an evaluation method at each of the welding points.

FIG. 9 is a flowchart showing an example of a series of processes for evaluating the welding quality of one workpiece W. In the following description, a case where one welding point WP to be evaluated among a plurality of welding points WP set on one workpiece W is set as an "evaluation target point" and all of the plurality of welding points WP on the workpiece W are set as evaluation targets is exemplified. In this series of processes, first, the evaluation apparatus 100 executes step S21. In step S21, the data acquisition unit 112 acquires information indicating a setting operation of the robot 40 during welding to the workpiece W to be evaluated.

Next, the evaluation apparatus 100 executes steps S22 and S23. In step S22, for example, the evaluation apparatus 100 waits until welding to any of the evaluation target points of the plurality of welding points WP is completed. In step S23, for example, the data acquisition unit 112 acquires the welding data of the evaluation target point on which welding has been performed when waiting in step S22. In one example, the data acquisition unit 112 acquires, as the welding data, various feature amounts obtained from a voltage or a current of electric power supplied to the workpiece W for arc discharge when welding is performed on the evaluation target point.

Next, the evaluation apparatus 100 executes step S24. In step S24, for example, the quality evaluation unit 116 acquires the determination algorithm corresponding to the evaluation target point on which welding has been performed when waiting in step S22. In one example, the quality evaluation unit 116 selects the determination algorithm corresponding to the place to be evaluated from among the plurality of determination algorithms held by the algorithm holding unit 132 in accordance with the place to be evaluated and the setting operation acquired in the step S21.

Next, the evaluation apparatus 100 executes step S25. In step S25, for example, the quality evaluation unit 116 evaluates the welding quality of the welding performed on the evaluation target point when waiting in step S22, based on the welding data acquired in step S23 and the determination algorithm acquired in step S24. In one example, the quality evaluation unit 116 evaluates the welding quality at the evaluation target point by acquiring, as the welding quality, an output result obtained when the welding data acquired in step S23 is input to the determination algorithm acquired in step S24.

Next, the evaluation apparatus 100 executes step S26. In step S26, for example, the evaluation apparatus 100 determines whether welding has been performed on all of the plurality of welding points WP set on one workpiece W. In step S26, when it is determined that welding has not been performed on all of the plurality of welding points WP (step S26: NO), the evaluation apparatus 100 changes the evaluation target point and repeatedly performs a series of processes of steps S22 to S26. As a result, the evaluation apparatus 100 evaluates the welding quality for each of the welding points WP with any one of the plurality of welding points WP as an evaluation target point.

When it is determined in step S26 that welding has been performed on all of the plurality of welding points WP (step S26: YES), the evaluation apparatus 100 performs step S27. In step S27, for example, the image generation unit 118 generates the evaluation result image including information indicating the estimation result of the welding quality for each of the welding points WP obtained by the execution of step S25 and a workpiece image in which information indicating a plurality of welding points WP is superimposed on the workpiece W. In one example, the image generation unit 118 displays the evaluation result image on the monitor 106.

Figure 10:
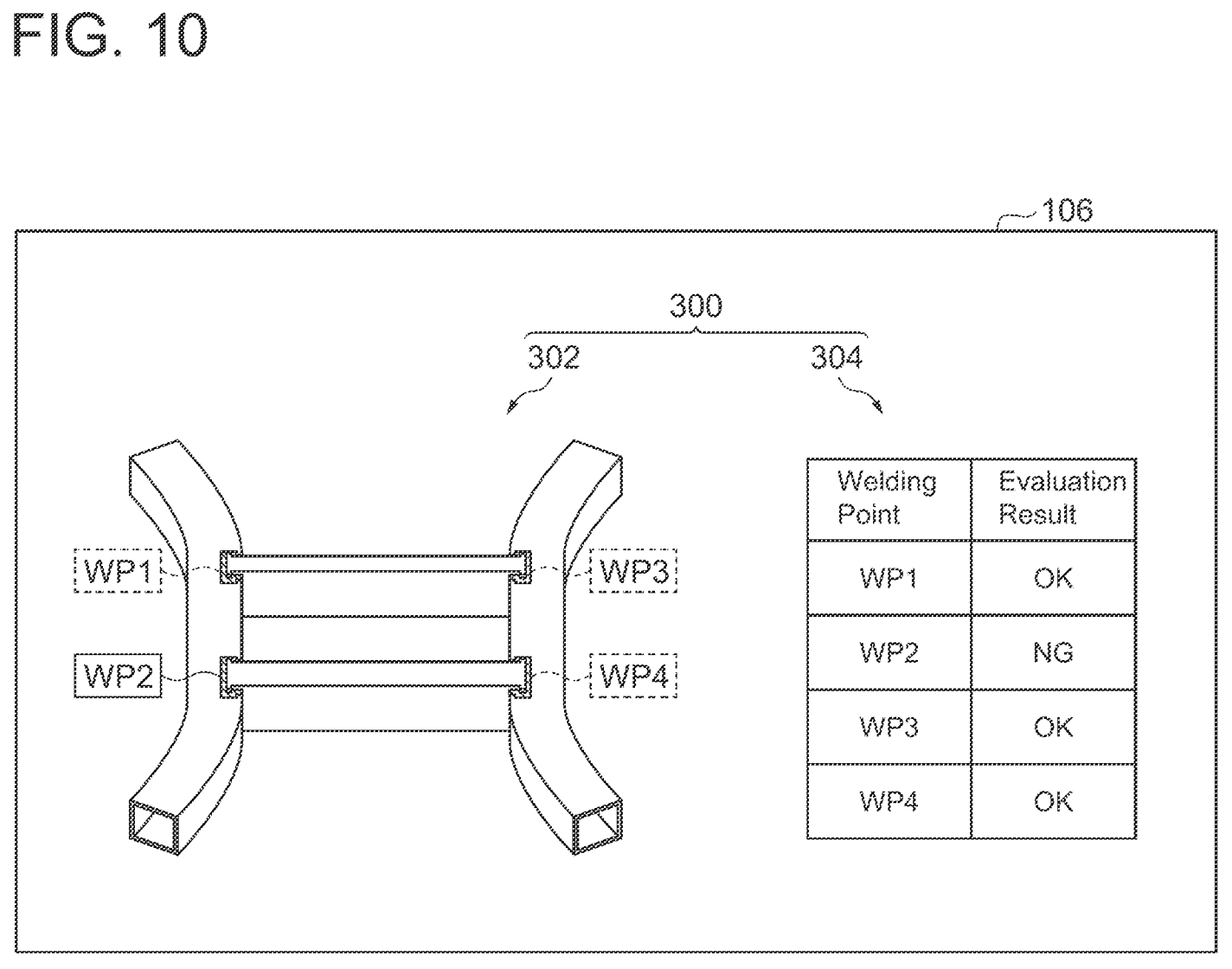

FIG. 10 shows an example of an evaluation result image generated in step S27. The evaluation result image illustrated in FIG. 10 includes a workpiece image 302 and evaluation information 304. The workpiece image 302 is an image similar to the workpiece image 202, and information indicating the workpiece W and the welding points WP1 to WP4 set on the workpiece W is superimposed on the image of the workpiece W. The evaluation information 304 indicates an assessment result in step S25.

In the example illustrated in FIG. 10, the welding quality is evaluated as normal for the welding points WP1, WP3, and WP4, and the welding quality is evaluated as not normal for the welding point WP2. As shown in FIG. 10, the welding point WP2 where the welding quality is evaluated to be not normal may be displayed differently from other points on the workpiece image 202. In this case, the evaluation result image 300 may not include the evaluation information 304, and information indicating an evaluation result of the welding quality for each of the welding points WP may be indicated in the workpiece image 302. For example, the welding point WP determined to be not normal may be displayed in a color different from that of the welding point WP determined to be normal.

By executing the series of processes of steps S21 to S27 described above, the evaluation of the welding quality for one workpiece W ends. The evaluation apparatus 100 may also execute the series of processes of steps S21 to S27 for each of the other plurality of workpieces W. After the series of processes of steps S21 to S27 is ended, the welding quality on the actual workpiece W may be confirmed by the user (worker). In this case, the user may check the welding quality on the actual workpiece W with reference to the evaluation result image in the step S27.

The welding product including the workpiece W may be manufactured through a manufacturing process including a series of processes of steps S21 to S27 and welding to the workpiece W performed in parallel with the series of processes. The welding product may be obtained by performing this manufacturing process, or the welding product may be obtained by performing another manufacturing process after the manufacturing process. In these cases, the manufacturing method of the welding product includes executing welding on the plurality of welding points WP set on the workpiece W by the welder 10, and acquiring the welding data indicating the state during execution of welding on the plurality of welding points WP. In addition, the manufacturing method includes evaluating the welding quality for each of the welding points WP based on the acquired welding data and the determination algorithm which is associated with each of the welding points WP.

(Modifications)

The above-described series of processes illustrated in FIG. 6, FIG. 8, or FIG. 9 is an example, and can be changed as appropriate. In the series of processes described above, the evaluation apparatus 100 may execute one step and the next step in parallel, or may execute each step in an order different from that of the example described above. The evaluation apparatus 100 may omit any of the steps or may execute a process different from the above-described example in any of the steps. For example, the evaluation apparatus 100 may execute the processing of step S25 each time the welding quality is evaluated for one welding point WP (each time step S27 is executed). The evaluation apparatus 100 may evaluate the welding quality for each of the welding points WP after welding is performed on all the welding points WP to be evaluated (may repeatedly perform step S25 for each of the welding points WP).

In the example described above, the determination algorithm is constructed for some of the plurality of welding points WP, but the algorithm construction unit 128 may construct the determination algorithm for all of the plurality of welding points WP based on the accumulated welding data. In this case, the algorithm setting unit 124 is not provided, and the evaluation apparatus 100 may not perform setting of the determination algorithm (setting of whether to construct or assign the determination algorithm) for the plurality of welding points WP.

The welding data may vary depending on the consumption state of the welder 10. That is, even when welding is performed on the same welding point WP between different workpieces W (workpieces W of the same type and different individuals), if the consumption state of the welder 10 is different, the welding data obtained at that time may be different. For this reason, the determination algorithm acquired in step S24 for one welding point WP may include a plurality of state-specific algorithms via which the welding quality is determined in step S25 in respective consumption states of the welder 10 based on the welding data.

In this case, the quality evaluation unit 116 estimates the consumption state of the welder 10, and then uses one state-specific algorithm corresponding to the estimation result of the consumption state among a plurality of state-specific algorithms for evaluating the welding quality. The quality evaluation unit 116 may estimate the consumption state according to the number of welding times or welding time from a time point when a component (for example, a contact tip) included in the welder 10 is replaced.

The contact tip included in the welding torch 11 may be replaced depending on the number of welding times or welding time. The number of times of welding corresponds to, for example, the number of times of use accumulated for each one time of welding to any of the welding points WP. The welding time corresponds to, for example, an integrated value of time used for welding from the time point of replacement or elapsed time from the time point of replacement. In this case, the consumption state of the contact tip differs depending on the number of welding times or welding time at the point of replacement. Different contact tip consumption states may result in varying welding data regardless of whether the welding quality is normal.

Similarly to the example of the determination algorithm described above, the state-specific algorithm may be an algorithm that performs comparison with a threshold value, or may be a determination model constructed by machine learning. Even when the state-based algorithm is used, the quality evaluation unit 116 may determine whether or not the welding quality is normal, and may calculate the degree of deviation from the reference quality.

When a plurality of consumption states of the components included in the welder 10 are associated with the welding data, the data accumulation unit 126 may further associate the consumption states of the components included in the welder 10 with each other and accumulate the welding data. The algorithm construction unit 128 may construct a determination algorithm (for example, a determination model) for each consumption state of a component. In one example, the algorithm construction unit 128 constructs, in step S17 the first state-specific algorithm when the number of times of welding or the welding time is in a first range, and constructs the second state-specific algorithm when the number of times of welding or the welding time is in a second range larger than the first range.

The welding data used for evaluation of the welding quality is not limited to the example described above. The welding data may be a waveform obtained by frequency-converting a temporal change in voltage or current of a power source for generating an arc discharge, or a feature amount obtained from the waveform. Action data (data indicating an action state of welding energy from the welder 10), which is a type of the welding data, may include data indicating an arc sound obtained from a microphone while the welder 10 performs welding. When the welder 10 performs laser welding, the action data may include data indicating an output state of a laser beam for laser welding or data indicating a state of reflected light associated with irradiation of the workpiece W. Operation data, which is a type of welding data, may include data obtained from the operation of the robot 40.

In a region where one welding bead, which is a continuous weld mark, is formed (hereinafter, referred to as a "bead region"), in a case where two or more welding points WP are set in one bead region, the data acquisition unit 112 of the evaluation apparatus 100 may acquire the welding data for each of the two or more welding points WP in welding for one bead region. In this case, two or more determination algorithms may be constructed for one bead region, and the quality evaluation unit 116 may evaluate the welding quality for each of two or more welding points WP in welding for one bead region.

Effects of Embodiment

The welding system 1 according to the above-described embodiment includes the welder 10 that performs welding of the plurality of welding points WP set on the workpiece W, the data acquisition unit 112 that acquires the welding data indicating states of the plurality of welding points during execution of the welding on the plurality of welding points WP, and the quality evaluation unit 116 that evaluates the welding quality for each of the welding points WP based on the welding data acquired by the data acquisition unit 112 and the determination algorithm that is associated with each of the welding points WP and determines the welding quality according to the input of the welding data. It is also conceivable to construct a determination algorithm in accordance with various welding conditions at the time of welding in order to evaluate quality with high accuracy. In this case, however, detailed analysis of welding conditions is required for each of the welding points WP. On the other hand, in the welding system 1, since the welding quality is evaluated using the determination algorithm corresponding to each of the welding points WP, detailed analysis of the welding condition at one welding point WP is not necessary. Therefore, the welding system 1 is useful for achieving both accuracy of quality evaluation and simplification of algorithm construction used for quality evaluation.

The welder 10 may weld a plurality of welding points WP by arc welding. When arc welding is performed, there are various welding conditions even at one welding point WP. In the above-described configuration, since the evaluation is performed using the determination algorithm for each of the welding points WP, it is useful for simplifying the preparation process for the evaluation including the construction of the determination algorithm.

The welding data may include data obtained from at least one of a voltage and a current of a power supply for generating an arc discharge. When the welding quality is not normal, the data of the power supply at the time of executing the arc welding tends to show a different tendency from the data obtained when the welding quality is normal. This is useful for improving the accuracy of the quality evaluation for each of the welding points WP.

The determination algorithm may include a plurality of state-specific algorithms via which the welding quality is determined in respective consumption states of the welder 10 based on the welding data. The quality evaluation unit 116 may evaluate the welding quality based on the welding data acquired by the data acquisition unit 112 and one state-specific algorithm corresponding to an estimation result obtained by estimating corresponding one of the consumption states among the plurality of state-specific algorithms. The welding data may vary depending on the consumption state of the welder 10. In the above-described configuration, since evaluation is performed using an algorithm corresponding to the consumption state, it is difficult to be affected by variation of the welding data caused by the consumption state. This is useful for improving the accuracy of the quality evaluation for each of the welding points WP.

The quality evaluation unit 116 may estimate the consumption state according to the number of welding times or welding time from the point of replacing the components included in the welder 10. The welding data (for example, data indicating a state of action of welding energy on the workpiece W) may vary depending on the number of times of welding or the welding time from the replacement time of components included in the welder 10. In the above configuration, the welding quality is evaluated using the state-specific algorithm according to the estimation result of the consumption state according to the number of welding times or the welding time. Therefore, since the welding quality is evaluated in consideration of the consumption state, it is useful for improving accuracy of quality evaluation for each of the welding points WP.

The quality evaluation unit 116 may evaluate the welding quality by calculating the degree of deviation from the reference quality. In this case, it is possible to present to the user not only whether or not the welding quality is normal but also how far the welding quality is from a normal state. Therefore, it is useful for improving user convenience.

The welding system 1 may further include a robot 40 that changes the position and orientation of a welding tool for supplying welding energy to the workpiece W in the welder 10. The quality evaluation unit 116 may evaluate the welding quality based on the determination algorithm which is associated with each of the welding points WP and the setting operation of the robot 40 set in advance for the welding points WP, and the welding data acquired by the data acquisition unit 112. Even in welding to the same welding point WP, the welding data may vary if the operation of the robot 40 is different. In the above-described configuration, since the evaluation is performed using the algorithm corresponding to the welding point WP and the setting operation of the robot 40, it is difficult to be affected by the variation of the welding data caused by the setting operation. This is useful for improving the accuracy of the quality evaluation for each of the welding points WP.

The welding system 1 may further include a data accumulation unit 126 that accumulates the welding data acquired by the data acquisition unit 112 in association with the welding points WP, and an algorithm construction unit 128 that constructs a determination algorithm for each of at least some of the plurality of welding points WP based on the accumulated data accumulated by the data accumulation unit 126 by machine learning. In this case, since the algorithm is constructed from the accumulated data, it is useful for improving the accuracy of quality evaluation.

The welding system 1 may further include a robot 40 that changes the position and orientation of a welding tool for supplying welding energy to the workpiece W in the welder 10. The data accumulation unit 126 may further associate a preset operation of the robot 40 with the welding point WP and accumulate the welding data. Even at the same welding point WP, the tendency of the welding data may change if the operation of the robot 40 is different. In the above configuration, since the determination algorithm is constructed based on the accumulated data associated with the welding point WP and the setting operation, it is further useful for improving the accuracy of quality evaluation.

The determination algorithm may include an approximation algorithm configured to output virtual data approximating the welding data in response to an input of the welding data. The quality evaluation unit 116 may evaluate the welding quality based on the degree of deviation between the welding data acquired by the data acquisition unit 112 and the virtual data obtained from the approximation algorithm. In this case, it is possible to construct the approximation algorithm from the welding data in which the welding quality is classified as normal without accumulating the welding data in which the welding quality is classified as abnormal. Therefore, it is further useful for simplifying the algorithm construction work.

The welding system 1 may further include an algorithm setting unit 124 that sets a determination algorithm corresponding to each of at least some of the plurality of welding points WP in response to an instruction from the user. In this case, a determination algorithm suitable for each of the welding points WP can be set (assigned). This is useful for improving the accuracy of evaluation of the welding quality for each of the welding points WP.

The algorithm holding unit 132 may set a first welding point among the plurality of welding points WP as a point where the determination algorithm is constructed based on the accumulated data of the welding data in response to an instruction from the user, and may set a second welding point among the plurality of welding points WP as a point to which the determination algorithm constructed for other welding points is assigned in response to an instruction from the user. In this case, the determination algorithm can be shared between similar welding points WP. Therefore, it is further useful for simplifying the preparation work including the construction of the algorithm.

The welding system 1 may further include an image generation unit 118 that generates an interface image 200 including a workpiece image in which information indicating a plurality of welding points WP is superimposed on the workpiece W, and an input information acquisition unit 122 that acquires an instruction from a user based on an input to the interface image 200 generated by the image generation unit 118. In this case, the user can perform setting work of the determination algorithm while easily grasping the welding points WP set on the workpiece W. Therefore, it is useful for improving user convenience.

The image generation unit 118 may generate an evaluation result image 300 including information indicating an evaluation result by the quality evaluation unit 116 for each of the welding points WP and the workpiece image 202. In this case, the user can easily grasp a portion where the welding quality is estimated to be not normal, and then perform the welding confirmation work. Therefore, it is useful for improving user convenience.

The welder 10 may be capable of performing welding such that a welding bead is formed on the workpiece W. The plurality of welding points WP may include two or more welding points WP that respectively corresponds to two or more sections obtained by dividing one welding bead in the workpiece W. In this case, even if welding conditions (for example, gaps between members to be welded) are largely different between a plurality of sections included in a region where one welding bead is formed, the welding quality can be evaluated for each of the plurality of sections. This is useful for improving the accuracy of quality evaluation while simplifying the work of constructing an algorithm by evaluating each portion (region) of the workpiece W.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A welding system comprising:

a welder configured to weld a workpiece at welding points on the workpiece, each welding point of the welding points respectively includes at least a part of a welding bead that is a continuous weld mark;

a robot configured to change a position and a posture of a welding tool of the welder to supply welding energy to the workpiece;

data acquisition circuitry configured to acquire welding data indicating welding quality at the welding points;

an algorithm holding unit that stores a plurality of determination algorithms associated with the welding points; and quality evaluation circuitry configured to evaluate the welding quality at each of the welding points based on the welding data according to a respective determination algorithm, among the plurality of determination algorithms, that is associated with a respective welding point of the welding points, wherein the quality evaluation circuitry is configured such that at least one determination algorithm of the plurality of determination algorithms is used by the quality evaluation circuitry to evaluate the welding quality at more than one welding point of the welding points, the more than one welding point being on different welding beads, and wherein the at least one determination algorithm of the plurality of determination algorithms is further associated with an operation of the robot at each of the welding points to accumulate the welding data indicating welding quality.

2. The welding system according to claim 1, wherein the welder is configured to weld the welding points with an arc.

3. The welding system according to claim 2, wherein the welding data includes data obtained from at least one of a voltage and a current of an electric power to generate the arc.

4. The welding system according to claim 1,
wherein at least one determination algorithm of the plurality of determination algorithms includes a plurality of state-specific algorithms according to a consumption state of the welder, and
wherein the quality evaluation circuitry is configured to evaluate the welding quality according to one of state-specific algorithms corresponding to the consumption state.

5. The welding system according to claim 4, wherein the quality evaluation circuitry is configured to estimate the consumption state according to a number of times of welding or a period of time of welding from a point of time at which a component of the welder has been replaced.

6. The welding system according to claim 1, wherein the quality evaluation circuitry is configured to evaluate the welding quality by calculating a degree of deviation from a reference quality.

7. The welding system according to claim 1, further comprising:
data accumulation circuitry configured to accumulate the welding data in association with the welding points; and
algorithm construction circuitry configured to construct at least one determination algorithm of the plurality of determination algorithms for at least some of the welding points with machine learning based on accumulated data accumulated by the data accumulation circuitry.

8. The welding system according to claim 7,
wherein the data accumulation circuitry is configured to store the welding data in association with an operation of the robot at each of the welding points.

9. The welding system according to claim 1,
wherein at least one determination algorithm of the plurality of determination algorithms includes an approximation algorithm via which virtual data approximate to the welding data are output in response to an input of the welding data, and
wherein the quality evaluation circuitry is configured to evaluate the welding quality based on a degree of deviation between the welding data acquired by the data acquisition circuitry and the virtual data obtained via the approximation algorithm.

10. The welding system according to claim 1, further comprising:
algorithm setting circuitry configured to set at least one determination algorithm of the plurality of determination algorithms corresponding to at least some of the welding points in response to an instruction from a user.

11. The welding system according to claim 10,
wherein, according to a further instruction from the user, the algorithm setting circuitry is configured to set a first welding point among the welding points as a point where the at least one determination algorithm is constructed based on accumulated data of the welding data, and wherein, according to another instruction from the user, the algorithm setting circuitry is configured to set a second welding point among the plurality of welding points as a point where the at least one determination algorithm is constructed for another welding point among the welding points.

12. The welding system according to claim 10, further comprising:
image generation circuitry configured to generate an interface image including a workpiece image in which information indicating the welding points is superimposed on the workpiece; and
input information acquisition circuitry configured to acquire an additional instruction from the user based on an input via the interface image generated by the image generation circuitry.

13. The welding system according to claim 12, wherein the image generation circuitry is configured to generate an evaluation result image including the workpiece image and information indicating an evaluation result that is evaluated by the quality evaluation circuitry for each of the welding points.

14. The welding system according to claim 1,
wherein the welder is configured to weld such that a welding bead is formed on the workpiece, and
wherein the welding points include a plurality of welding points that respectively corresponds to a plurality of sections obtained by dividing one welding bead on the workpiece.

15. A method for manufacturing a welding product, comprising:
welding a workpiece at welding points on the workpiece, each welding point of the welding points respectively includes at least a part of a welding bead that is a continuous weld mark;
changing a position and a posture of a welding tool of the welder using a robot to supply welding energy to the workpiece;
acquiring welding data indicating welding quality at the welding points;
acquiring a plurality of determination algorithms associated with the welding points; and
evaluating the welding quality at each of the welding points based on the welding data according to a respective determination algorithm, among the plurality of determination algorithms, that is associated with a respective welding point of the welding points,
wherein at least one determination algorithm of the plurality of determination algorithms is used by the quality evaluation circuitry to evaluate the welding quality at more than one welding point of the welding points, the more than one welding point being on different welding beads, and
wherein the at least one determination algorithm of the plurality of determination algorithms is further associated with an operation of the robot at each of the welding points to accumulate the welding data indicating welding quality.

16. The method according to claim 15,
wherein each welding point corresponds to a separate respective welding bead.

17. The welding system according to claim 1,
wherein each welding point corresponds to a separate respective welding bead.

* * * * *